June 25, 1968 J. J. GREBE 3,389,879
AIRCRAFT
Filed Oct. 22, 1965 2 Sheets-Sheet 1

INVENTOR.
John J. Grebe
BY
C. Kenneth Bjork
AGENT

June 25, 1968 J. J. GREBE 3,389,879
AIRCRAFT

Filed Oct. 22, 1965 2 Sheets-Sheet 2

INVENTOR.
John J. Grebe
BY
C. Kenneth Bjork
AGENT

United States Patent Office 3,389,879
Patented June 25, 1968

3,389,879
AIRCRAFT
John J. Grebe, Midland, Mich.
(12430 W. St. Andrews Drive, Sun City, Ariz. 85351)
Filed Oct. 22, 1965, Ser. No. 501,716
5 Claims. (Cl. 244—17.11)

ABSTRACT OF THE DISCLOSURE

The present invention comprises an aircraft in the shape of a fuselage-wing airfoil fitted with at least one movable pressure equalizing assembly. The pressure equalizing assembly comprises a multiplicity of spaced apart components separated by through passages extending from the bottom surface to the top surface of the airfoil. The aircraft, by its unique design and construction, provides unexpected smoothness of flight at both low and high speeds as well as excellent flight control.

---

This invention relates to an aircraft and more particularly is concerned with a novel multipurpose aircraft which can operate with the optimum of safety at both low and high speeds as well as provides the added advantage of vertical take-off and landing.

It is a principal object of the present invention to provide an aircraft which can operate at supersonic speeds with low induced drag energy loss. This is markedly different from conventional supersonic aircraft which waste much power in turbulence and sonic boom.

It is another object of the present invention to provide an aircraft which can operate at supersonic speeds but which also can take off and land vertically, i.e. like a helicopter.

It is another object of the present invention to provide an improvement for high speed aircraft whereby increased efficiency of operation and substantial reduction of air turbulence at the trailing edge of an airfoil surface is realized.

It is also an object of the present invention to provide an aircraft which provides the optimum in safety of operation, particularly with respect to landing, in that it can descend either with or without power from jet type thrust producing members or rotor drive means.

It is a further object of the present invention to provide an aircraft which can be used for high speed flights of both short and long distances without the need of long take-off and landing distance thereby eliminating the need for large airports with long runways thus giving true "city to city" transportation.

These and other objects and advantages readily will become apparent from the detailed description presented hereinafter when read in conjunction with the accompanying drawings.

Figure 2:
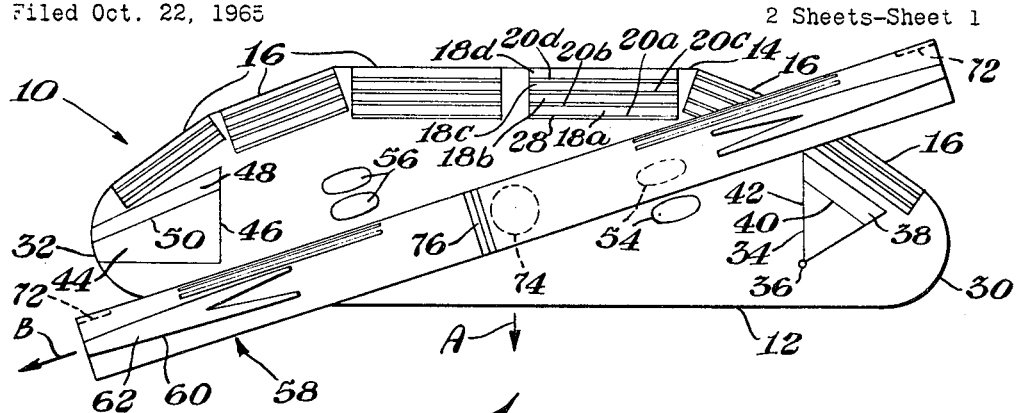
FIGURE 2 is a plan from the top of the aircraft depicted in FIGURE 1.
Figure 1:
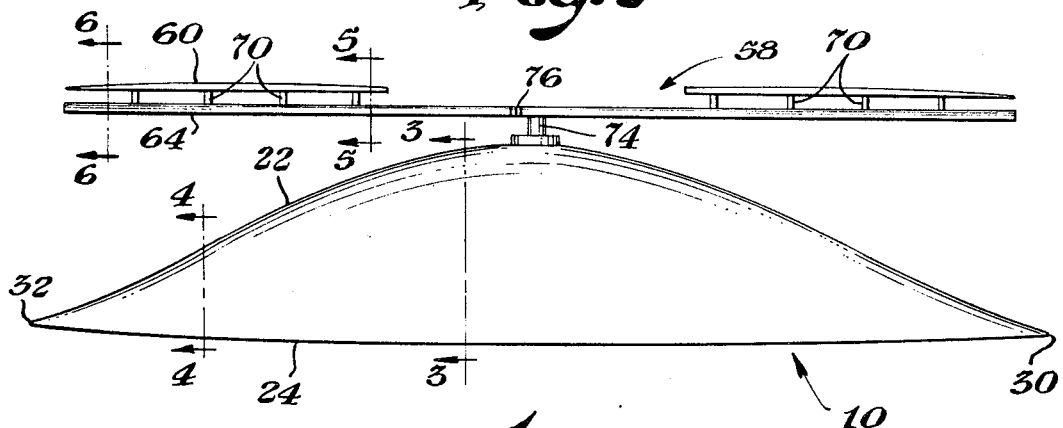
FIGURE 1 is a front elevation of one embodiment of the novel aircraft of the present invention.

In general, the present novel aircraft comprises a thick wing-shaped fuselage in the configuration of an airfoil fitted with multiposition and multipurpose novel control elements for flight and direction control and having jet-type power units capable of producing thrust sufficient for subsonic and supersonic flight as desired as well as rotor-blade assemblies for vertical and very slow speed forward flight.

The figures of the drawings show one embodiment of the present invention. This depicted embodiment is meant to be illustrative only and by no means is limiting to my novel and useful improvements in an aircraft.

The aircraft shown in the drawings comprises a thick wing-shaped fuselage 10 in the shape of an airfoil. This fuselage 10, when viewed from the front looking toward the leading edge 12 has an outline substantially in the shape of a minor chord of a circle.

Figure 3:
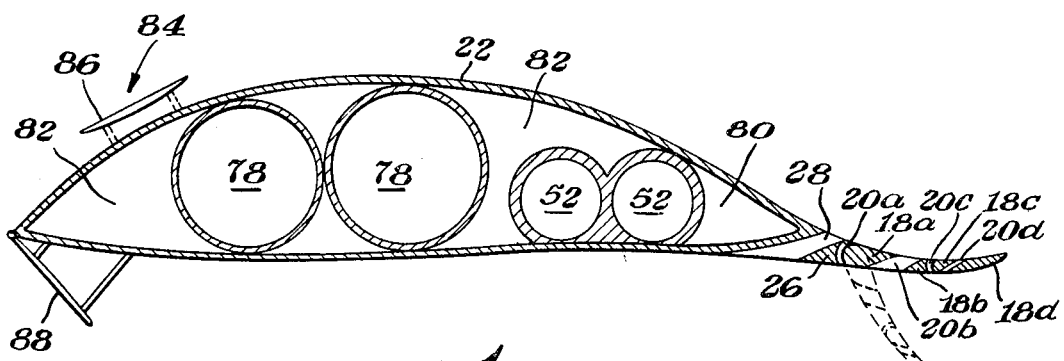
FIGURE 3 is a sectional view taken along line 3—3 of FIGURE 1.
Figure 4:
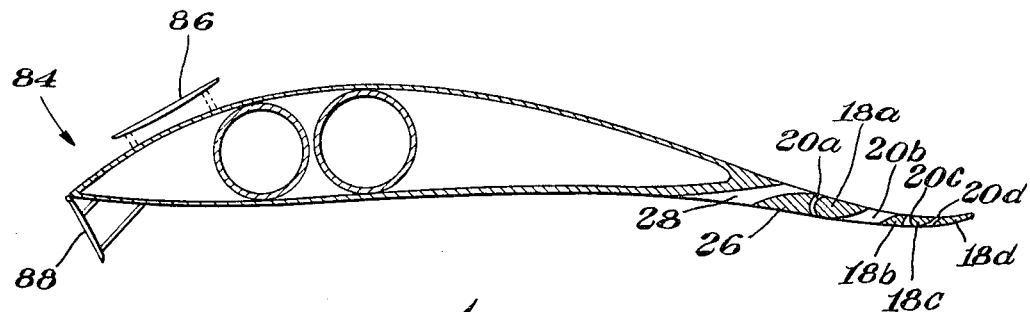
FIGURE 4 is a sectional view taken along line 4—4 of FIGURE 1.
Figure 5:
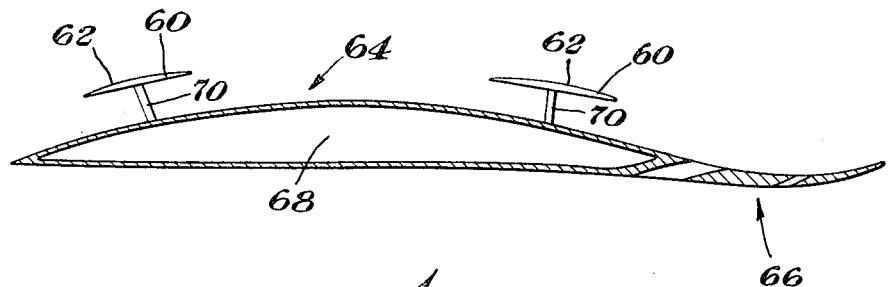
FIGURE 5 is a sectional view of a double stacked two blade rotor assembly for use with the present aircraft taken along line 5—5 of FIGURE 1.
Figure 6:
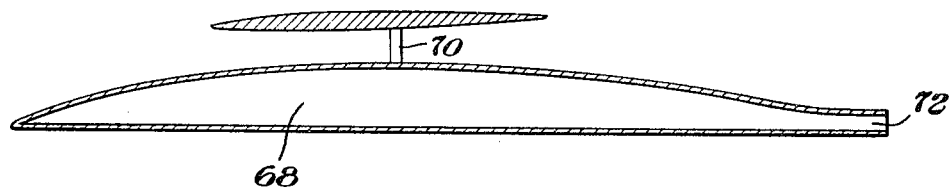
FIGURE 6 is a second cross-sectional view of the rotor assembly taken along line 6—6 of FIGURE 1.

The trailing edge 14 of the fuselage-wing member 10 contains a multiplicity of movable, pressure equalizing assemblies 16, referred to hereinafter on occasions as lift and drag control assemblies or as elevator-stabilizer-aileron assemblies. Each of these lift and drag control assemblies 16 is composed of a series of shaped members 18a, 18b, 18c, 18d separated one from the other by passages 20a, 20b, 20c, which communicate with the undersurface 24 and top surface 22 of the craft. As shown in the figures, the elements 18a, 18c and 18d in cross-section are generally in the shape of an airfoil. Member 18b in cross-section is substantially triangular in shape. Each of the multicomponent pressure equalizing assemblies 16 is joined to the fuselage 10 at its forward member 18a by means of at least one pivot hinge (not shown). This hinge in turn is connected to a mechanical, electro-mechanical, pneumatic, hydraulic or the like power-drive mechanisms such that each presure-equalizing assembly 16 can be moved about the pivot hinge and be raised and lowered out of its normal position which is in line with the contour of said wing-body member 10. This assembly is shown in one alternative position by dotted lines in FIGURE 3.

The most important aspect of the pressure equalizing assemblies 16 at the trailing edge of fuselage 10 and the fuselage 10 itself is that the thickness of said assemblies 16 or airfoil fuselage 10 is distributed above and below the center line of these members in the vicinity of the trailing edge 14 and is on a slope from both the top 22 and bottom 24 surfaces, these meeting about in line with the resulting airflow over the assembly 16 or fuselage 10 at the trailing edge during flight.

A substantially triangular shaped member 26 also is present in the fuselage proper near the front of each pressure equalizing assembly 16 extending across the width of this assembly 16. A through passage 28 is present between member 26 and the fuselage 10 preceding.

The through passages 20a, 20b, 20c, 20d and 28 serve to direct air from the underside 24 of the fuselage over the upper surface 22 at the trailing portion of the fuselage 10. The movement of air through these passages during flight, particularly at high speeds, further aids in reducing the turbulence and wasted energy from buffeting encountered in conventional aircraft by increasing the energy of the air above the upper surface 22 near the trailing edge. Additionally, the combination of the through passages 20a-d, and 28, pressure equalizing assemblies 16 and integral wing-fuselage 10 also eliminates much of the energy source for sonic boom and its accompanying discomforts while assuring smooth supersonic operation.

As shown in the figures and described hereinbefore, each elevator-aileron-stabilizer assembly 16 has a total of four elements 18a-d and four through passages 20a-d. Additionally, there is one substantially triangularly shaped, curved surface element 26 and a single through passage 28 in the fuselage 10. Depending on the size of the craft, there can be fewer or more of these through passages and elements in the pressure equalizing assemblies 16 and fuselage 10.

Increased efficiency of operation and a marked reduction in turbulence is achieved from shaped, movable pressure-equalizing assemblies 16 in which there are no through passages. In fact, improvement in smoothness of flight at high speeds is realized from a fixed or variable swept-wing having a cross-sectional configuration and thickness distribution at the trailing edge as described hereinbefore for the pressure equalizing assembly 16 and fuselage 10 of the present novel craft.

As shown in the depicted embodiment, the trailing edge 14 is fitted with six of the pressure equalizing assemblies 16. These differ both in width and length depending on their placement in the fuselage 10. In other embodiments of the present invention, both the total number of these assemblies 16 and their size and placement in an aircraft can vary from craft to craft depending on the size of such aircraft but in any event at least one must be present.

Ordinarily, the pressure equalizing assembly or assemblies 16 are positioned in a fuselage such that they are symmetrically arranged, i.e. centered, on each side of the center line dividing the airfoil fuselage 10 in its long dimension as measured from edge 30 to edge 32. By such an arrangement, the optimum in stability during glide landings is achieved especially during low power or "dead stick" descent.

A substantially triangularly shaped multiposition flight and direction control member, i.e. rudder-fin, 34 having its major surface of the same contour as the top surface 22 of the fuselage 10 is fastened near one edge 30 to this member 10. This rudder-fin 34 is connected to the fuselage by means of a pivot 36, e.g. a ball and socket joint at its forwardmost edge. This rudder-fin 34 is capable of being raised upward from its closed position adjacent the upper surface 22 of the wing-fuselage 10. This rudder-fin 34 contains a movable element 38 which can be pivoted about hinge 40 when the rudder-fin is in the raised position. The versatility of this rudder-fin assembly is illustrated as follows. The rudder can be raised upwardly along a detachable hinge 42, by means such as a magnetic, sliding or other detachable locking hinge assembly. Once in the raised position, the rudder-fin 34 can be pivoted back and forth as desired for flight control about pivot member 36 thereby defining an arc above the upper surface 22 of the fuselage-wing 10 in the same manner as a conventional airplane rudder. Additionally, the member 38 can be moved about hinge 40 for additional direction control.

The rudder-fin can be raised by pulley-cable apparatus or other mechanical, hydraulic or pneumatic drive and control assemblies. These not only can provide the means for raising and lowering the rudder-fin member 34 but also act as a stabilizing means to hold the rudder-fin 34 in a given raised position. It is not necessary that the rudder-fin 34 be raised to its full height, for, depending on the actual flight conditions it can be raised and secured at a position intermediate the closed or full raised position. Further, it is to be understood that as the speed of the craft changes during flight additional control of the craft is achieved by raising and lowering of the rudder-fin 34.

A second substantially truncate triangularly shaped rudder-fin 44 is attached to the fuselage-wing 10 near its edge 32. This member 44 has its major surface in the same contour as the wing-fuselage portion directly underlying. This member 44 can be raised, lowered and secured at a predetermined position, using mechanisms as described hereinbefore, about a hinge 46. Element 48 of rudder-fin 46 is movable about hinge 50 when the rudder-fin 46 is in the raised position. This rudder-fin 46 when raised serves as a further control for landing, particularly at slow speeds, e.g. "dead stick" landings.

For high speed flight, at least one ram jet, turbojet, pulse jet engine or other jet type thrust producing power unit 52 is positioned in the fuselage 10 such that its exhaust nozzle 54 during operation directs a high velocity working gas stream outwardly in the direction of an edge of said fuselage 10. In the depicted embodiment, the aircraft is equipped with two such units 52, their exhaust nozzles 54 indicated as exiting above the upper surface 22 of the wing-fuselage 10. These nozzles 54 are at an angle with respect to and positioned near the trailing edge 14 of the fuselage 10 near side edge 30. Also as shown, air inlet ducts 56 are positioned in the upper surface 22 of fuselage 10.

Inlet air ducts 56 are positioned forward in the structure. The actual design and position of ducts 56 in the structure for inducting and precompressing air required for high speed flight is understood by one skilled in the art. Further, these should be of a construction such that air turbulence and a build-up of potential "sonic boom energy" on the air foil surface is avoided. To illustrate, each air intake duct 56 can be fitted with a cowl into which air adjacent the outer surface of the duct 56 is directed and from whence such air is discharged or vented downstream.

Since, as will be discussed hereinafter, during operation the attitude of the craft changes with changes in flight from vertical to slow forward speeds and on to higher subsonic and supersonic speeds, the exhaust nozzles 54 of the jet power units 52 ordinarily are adjustable such that the high energy working gas stream is always directed to the edge of the craft which is the trailing edge at any given instant of flight.

Although two jet thrust producing units have been shown in the depicted embodiment, the number of such units to be employed for an aircraft of the present invention can be varied depending on the size of craft and power units as well as the ultimate speed desired.

In addition to the jet type thrust producing units 52, at least one helicopter rotor-blade assembly 58 is mounted on the fuselage-wing 10 on its upper surface 22.

In the depicted embodiment, one rotor assembly 58 is shown mounted on the top side of the fuselage-wing 10 near its center. The rotor-blade assembly 58 of the figures is a double stacked two-bladed unit. Each double stacked blade consists of an upper blade 60. This blade 60 is thin and in cross-section defines a minor chord of a circle, the upper surface 62 of the blade 60 being flat. The bottom blade 64 is thicker than blade 60 and has a cross-section in the general shape of an airfoil having a non-movable trailing edge 66 similar in shape to that of pressure-equalizing assemblies 16. The bottom blade 64 is hollow, being fitted with a through passage 68 extending its length. The blades 60 and 64 are separated and held in position by spacers 70. This double-stacked blade unit for most applications, has the general configuration of a Buseman venturi design for biplane foils and have the undersurface of the blades 60 and 64 substantially parallel to the undersurface of the fuselage-wing airfoil 10. Because of this design, during operation, torque is greatly reduced with lift being increased and efficiency being improved. At high rotational speeds because of the air foil design, pressure equalization between the inner and outer trailing surfaces minimizes energy losses at the trailing edge.

The far end of blade 64 is fitted with a nozzle type slot 72 on one edge near the end. The other end of the blade 64 communicates through the rotor assembly 74 with a high velocity gas source (not shown).

In the depicted embodiment, during operation, a high velocity gas stream, as from a by-pass in the main jet or its air compressor, for example, is fed into the lower hollow blade 64 at the hub 74 and out through passage 68 and through air driving means 72. By this action, these driving means 72 serve as an efficient drive means for the rotor-blade assembly 58. One of the blades is mounted to the rotor hub 74 by means of a ratatable pivot means 76. This pivot means 76 is designed to rotate the double-stacked blade 58 such that it is normally in its operating position when used as a drive means, i.e. the blades are turned such that their undersurfaces, which during flight when the rotor is used as a drive means are parallel to the base 24 of the fuselage-wing airfoil 10, are at an angle of about 90° to the undersurface 24 of the airfoil 10. The rotor is feathered for high speed flight when the rotor-blade assembly 58 is not in operation and the blade pivoted at about 90° about means 76 thereby serving to stabilize the rotor blade assembly in one position during high speed flight and thus acting in the manner of a weather vane in that it keeps the blades of the rotor assembly stabilized and pointed in the same direction as the flight of the airfoil 10.

Alternatively, a three-bladed double stacked rotor-blade assembly in the configuration ordinarily employed for such assemblies can be employed. In this type of drive unit, the pivot assembly 76 would be placed only on one blade. Also standard single-stacked two, three or more bladed helicopter rotor assemblies can be used. All of the depicted blade assemblies can be powered by piston or jet engines through a power transmitting drive means, by ram jets at the outer edges of the blade by air power drive as described hereinbefore or by other drive mechanisms for such units.

As is understood by one skilled in the art, rotor blades of the "solid hub" type having rotor blades rigidly affixed to a hub or "articulated" rotor-blade assemblies wherein the blades are hinged to the hub to permit flapping and or lagging motions during operation can be employed.

As shown in the depicted embodiment, one rotor-blade assembly 58 has been employed. If desired a number of helicopter type rotor-blade drive units can be positioned at spaced apart intervals across the long dimension of the wing fuselage 10 from edge 30 to edge 32.

The interior of the wing-fuselage 10 usually is fitted with at least one substantially round pressurized cross-section cabin, or storage area 78. Pressurized fuel storage tanks 80 or cells and other pressure tubes 82 are distributed as determined necessary for space and balance. The use of such pressurized compartments provides for high strength in the structure with an accompanying light weight construction. By providing valved passages from the pressure tubes to the fuselage surface, air or gas pressure from these tubes and the like volumes can be fed or bled to the outer surface of the craft thereby providing boundary layer control. This gas or air movement can be energized by the pressure difference between the interior volumes of the craft and the surrounding wing surfaces. This boundary layer control gives increase in lift, flight precision and control and during landing takes the place of a large portion of the engin power ordinarily employed. This boundary layer control is most beneficial during low power or "dead stick" landings.

Additionally, in the present fuselage-wing the use of the pressurized cells or compartments within the fuselage for boundary layer control is a structurally simple means requiring a minimum of added weight for emergency control in that the airfoil surfaces are so close by and that it takes the place of impaired or enlarged control surfaces which now are added to conventional structures.

Another co-acting advantage offered by the present novel aircraft is the low center of gravity since personnel, cargo, fuel and the like are at the lowest level, the remaining higher void spaces being filled with gas, e.g. air.

Retractable landing gear assemblies (not shown) are positioned on the underside of the fuselage. These are fitted with a cover which when open for landing as the landing carriage is dropped, serves as an added stabilizer and guide. When the landing gear is retracted this cover may be used as an emergency skid or closed in line with the undersurface of the airfoil 10.

A single or multi-section movable flap assembly 84 which can be extended from edge 12 of the fuselage 10 extends substantially across the width of the thick wing 10 along edge 12.

This assembly 84 can be two separate members one of which 86 is positioned so as to be above the upper surface of the airfoil 10 where it serves, during high speed flight, to convert into thrust compressed air near the airfoil surface at this edge and prevents this from going into wasted sonic boom energy as the air passes through and exits from the venturi-like opening between the flap 86 and fuselage 10.

The other member 88 can be extended below the surface of air foil 10. By positioning the flap assembly 88 and pressure equalizing assemblies 16 on the opposite sides of thick-wing 10 such that they are about at a 90° angle with respect to the undersurface of air foil 10 and extend outwardly below the airfoil 10, the assemblies 88 and 16 co-act to provide not only for increased drag but also can be used to achieve a ground hover craft effect.

It is to be further understood that the flaps 84 also can be fitted to engage the undersurface of airfoil 10 in a tight fitting arrangement for certain flight conditions.

In an alternate arrangement, the assembly 84 can be of an integral construction joined to the fuselage through a common movable assembly whereby a single flap at different times can serve both of the functions set forth directly hereinbefore.

The operability and versatile utility of the present novel aircraft is illustrated from the following typical flight.

For a vertical takeoff from a small landing area, e.g. a heliport, power is imparted to the rotor-blade assembly and the craft rises in much the same manner as a conventional helicopter. Once in the air, the blades are adjusted such that these with the jet exhaust are used to propel the craft forward in relatively slow flight, e.g. up to about 100 knots. Alternatively, both the rotor-blade assemblies and the jet type thrust power units can be used in combination as a forward drive means. For such slow speed flight, the multi-position rudder fin is raised and used for flight and direction control.

For such slow speed operation, the direction of flight is normal to the leading edge of the wing fuselage as shown by the arrow A in FIGURE 2.

As the speed of flight increases, the power to the rotor blades is cut off and the tail vane of this member raised as the rotor is feathered whereupon the blades become positioned along the fuselage in the direction of the line of flight. With the increase in flight and speed and as the aircraft becomes dependent on the jet-type thrust producing power units it obtains the required lift from the thick wing fuselage. With increase in speed and directing power from these latter units by means of the adjustable nozzles and control surface the attitude of the craft changes until at near supersonic speeds and at supersonic speeds the flight direction is as shown by arrow B of FIGURE 2. At these speeds the multiposition rudder is lowered against the fuselage surface and the craft functions as a true flying wing.

Because of the novel fuselage-wing structure design of the present aircraft with its pressure equalizing assemblies, the transition from subsonic to supersonic speeds is achieved with much less buffeting and sonic boom energy than accompanies this transition in conventional supersonic aircraft.

This results from a combination of factors present in the instant novel structure. First, the disclosed fuselage-wing aircraft at high speeds actually rides on its own "bow-wave" of compressed air thereby always being lifted and pulled into the optimum "sweep-back" angle, behind the sonic cone. Secondly, because of the configuration of the pressure equalizing assemblies and the fuselage itself the trailing edge points in the direction of the gas mass as it leaves the rearward portion of the wing and the pressure equalizing assemblies after passing over it. With the pressure-equalizing assemblies having the through passages, a continuously directed air flow is passed from the under surface of the craft to the upper surface near the trailing edge. This air flow not only serves to stabilize the craft by smoothing out the air flow over the airfoil surface thereby removing turbulence at the trailing edges but also serves to provide an increase in thrust from a nozzle effect further promoting forward motion of the aircraft thereby increasing the efficiency of operation.

Because the pressure equalizing assemblies are adjustable to achieve various directed energies and regulated air velocities of various energies therethrough or in contact therewith unequalized energy differences can be spread into unequally spaced positions. The resulting destructive interference between the multiple sources of other remaining energy is directed by the cooperating and coacting members and assemblies of the present invention so as to eliminate or cancel out undesirable sonic boom noise now present in conventional high speed craft.

Additionally, because of the multiposition control elements, as has been mentioned hereinbefore, the present novel craft offers a variety of safety features, particularly with respect to landing not achieved prior to the present invention.

In landing on a runway, the aircraft can be brought in substantially normal to the leading edge with raised rudder-fin by power from the jets alone or using a combination of rotor-blade and jets. In any event, because of the novel wing fuselage airfoil, short runways can be employed. During such landing the pressure equalizing assemblies usually are lowered below the plane of the wing-fuselage to give added control.

For vertical landings, the rotor-blade assembly is used.

If all power is lost, the rotor-blade can be adjusted to rotate freely as in an autogyro. Additionally, with full power loss or other similar emergency landing, or if a relatively silent landing is desired, the flap in the leading edge and the pressure equalizing assemblies can be lowered whereupon the craft coasts in as a glider.

Both acceleration and braking can be achieved by fins designed to be an integral part of the landing carriage whereby the wheels can be rotated by air energy in a predetermined direction prior to "touch down" on landing or during flight.

The optimum in versatility, utility, operability and safety is achieved by the embodiment of the aircraft of the present depicted and described herein. However, it is to be understood that any of the novel assemblies employed in the present combination can be used for their intended purpose in other embodiments of the aircraft of the present invention as well as in other conventional aircraft. To illustrate, the pressure equalizing assembly, either as a fixed unit or as a movable assembly, with or without through passages can be employed with advantage on high speed subsonic and supersonic aircraft to increase their efficiency of operation and substantially minimize turbulence and energy losses now wasted in sonic boom effect and other high speed flight phenomena.

Various modifications can be made in the present invention without departing from the spirit or scope thereof for it is understood that I limit myself as defined in the appended claims.

I claim:

1. A thick wing-shaped airfoil fuselage, the trailing edge of said fuselage fitted with at least one pressure equalizing assemblies joined to the fuselage through its forward portion and being movable out of the contour line of said fuselage, each of said pressure equalizing assemblies consisting of a multiplicity of movable shaped members, said shaped members being separated one from the other by passages, said passages communicating with the underside and top surface of said fuselage-wing, said shaped members of each of said pressure equalizing assemblies in alternating positions in said assembly defining in cross-section an airfoil and a triangle, a rudder-fin connected to the top side of said fuselage near one edge through a pivot at its forward most edge, said rudder-fin having its major surface of the same contour as the top surface of said fuselage, said rudder being movable to a raised position about said pivot and out of the contour line of said fuselage and in the raised position being pivotable back and forth about said pivot member thereby defining an arc above the upper surface of said fuselage wing, at least one jet-type thrust producing power unit supported by said fuselage, the exhaust nozzles of said thrust producing power units during operation directing a high velocity working gas stream outwardly in the direction of an edge of said fuselage.

2. The aircraft as defined in claim 1, and having at least one helicopter rotor blade assembly mounted on said fuselage wing on its upper surface.

3. The aircraft as defined in claim 2 wherein each blade of said helicopter rotor-blade assemblies is a double stacked member, each of said upper blades being thin and substantially defining in cross-section a minor chord of a circle, each of said bottom blades being hollow and defining an air-foil in cross-section, an air driving means at the outer edge of each of the bottom blades of said double stacked blade member, said air driving means communicating with the hollow interior of said bottom blade, said bottom blade at its other end communicating during operation with a high velocity gas stream.

4. The aircraft as defined in claim 1 and including a second rudder-fin connected to the top side of said fuselage near the opposite edge of said fuselage, said second rudder-fin having its major surface of the same contour as the top surface of said fuselage, said second rudder-fin being movable to a raised position out of the contour line of said fuselage.

5. The aircraft as defined in claim 1 and having a multiplicity of said pressure equalizing assemblies fitted in said wing-shaped airfoil fuselage at the trailing edge of said fuselage-wing, said assemblies being symmetrically centered with respect to the long dimension of said wing-fuselage.

References Cited

UNITED STATES PATENTS

| | | | |
|---|---|---|---|
| D. 133,670 | 9/1942 | Metz | 244—35 X |
| 1,748,610 | 2/1930 | Marczynski | 170—165 |
| 2,167,601 | 7/1939 | Rose | 244—42 |
| 2,196,819 | 4/1940 | Vanetta | 170—165 |
| 2,344,266 | 3/1944 | Reissner | 170—165 X |
| 2,954,319 | 9/1960 | Gluhareff | 244—7 |
| 3,077,321 | 2/1963 | Dunham | 244—12 |
| 3,203,647 | 8/1965 | Alvarez-Calderon | 244—42 |
| 1,878,775 | 9/1932 | Henry | 244—42 |
| 2,380,535 | 7/1945 | McDevitt | 244—36 XR |
| 2,402,358 | 6/1946 | Bauman | 244—13 |
| 2,650,780 | 9/1953 | Northrop et al. | 244—36 XR |
| 2,891,740 | 6/1959 | Campbell | 244—42 XR |
| 3,061,244 | 10/1962 | Max | 244—42 |
| 3,090,580 | 5/1963 | Kehlet et al. | 244—113 XR |

FOREIGN PATENTS 706,924  4/1954  Great Britain.

FERGUS S. MIDDLETON, *Primary Examiner.*

MILTON BUCHLER, *Examiner.*

P. E. SAUBERER, *Assistant Examiner.*